United States Patent
Henry et al.

[11] Patent Number: 6,145,075
[45] Date of Patent: *Nov. 7, 2000

[54] APPARATUS AND METHOD FOR EXECUTING A SINGLE-CYCLE EXCHANGE INSTRUCTION TO EXCHANGE CONTENTS OF TWO LOCATIONS IN A REGISTER FILE

[75] Inventors: G. Glenn Henry; Terry Parks, both of Austin, Tex.

[73] Assignee: IP-First, L.L.C., Fremont, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 09/019,833

[22] Filed: Feb. 6, 1998

[51] Int. Cl.$^7$ .................................................. G06F 9/40
[52] U.S. Cl. ........................................... 712/225; 712/226
[58] Field of Search .................................... 712/225, 226; 711/211

[56] References Cited

U.S. PATENT DOCUMENTS

| | | | |
|---|---|---|---|
| 3,398,402 | 8/1968 | Delaigue et al. | 712/225 |
| 3,611,299 | 10/1971 | Lindsey et al. | 360/2 |
| 4,620,279 | 10/1986 | Read et al. | 710/22 |
| 5,367,650 | 11/1994 | Sharangpani et al. | 711/221 |
| 5,634,118 | 5/1997 | Blomgren | 712/226 |
| 5,751,295 | 5/1998 | Becklund et al. | 345/501 |
| 5,884,055 | 3/1999 | Tung et al. | 710/127 |

*Primary Examiner*—Meng-Ai T. An
*Assistant Examiner*—Gautam R. Patel
*Attorney, Agent, or Firm*—Richard K. Huffman; James W. Huffman

[57] ABSTRACT

An apparatus and method for exchanging operands within a microprocessor is provided. The apparatus contains a translator for generating a micro instruction that loads a first operand into a second location, and a second operand into a first location without specifying intermediate storage of either operand. In addition, interlock control is provided to disable interlock delay when executing an exchange instruction. Disabling the interlock control allows an exchange operation to be performed in 2 or less clock cycles. Also, a register file is used that allows two operands to be written to it in parallel. Operand write control is used with the register file to switch the operand specifiers in an exchange instruction during write back, to allow the specifiers used to retrieve operands from the register file to also be used for the exchange.

19 Claims, 6 Drawing Sheets

Fetch → Translate → Register → Address → Data/ALU → Write Back 102, 104, 106, 108, 110, 112 — 100

200

| Cycle | Fetch | Translate | Register | Address | Data/ALU | Write Back |
|---|---|---|---|---|---|---|
| 1 | XCHG R1,R2 | -- | -- | -- | -- | -- |
| 2 | NEXT MAC | MOV TMP, R1 | -- | -- | -- | -- |
| 3 | -- | MOV R1, R2 | MOV TMP, R1 | -- | -- | -- |
| 4 | -- | MOV R2, TMP | MOV R1, R2 | MOV TMP, R1 | -- | -- |
| 5 | -- | NEXT MIC | MOV R2, TMP | MOV R1, R2 | MOV TMP, R1 | -- |
| 6 | -- | -- | NEXT MIC | MOV R2, TMP | MOV R1, R2 | MOV TMP, R1 |
| 7 | -- | -- | -- | NEXT MIC | MOV R2, TMP | MOV R1, R2 |
| 8 | -- | -- | -- | -- | NEXT MIC | MOV R2, TMP |
| 9 | -- | -- | -- | -- | -- | NEXT MIC |

3 Cycles

FIG. 4

2-Cycle XCHG

| Cycle | Fetch | Translate | Register | Address | Data/ALU | Write Back |
|---|---|---|---|---|---|---|
| 1 | XCHG R1,R2 | -- | -- | -- | -- | -- |
| 2 | NEXT MAC | MOV R2, R1 | -- | -- | -- | -- |
| 3 | -- | MOV R1, R2 | MOV R2, R1 | -- | -- | -- |
| 4 | -- | NEXT MIC | MOV R1, R2 | MOV R2, R1 | -- | -- |
| 5 | -- | -- | NEXT MIC | MOV R1, R2 | MOV R2, R1 | -- |
| 6 | -- | -- | -- | NEXT MIC | MOV R1, R2 | MOV R2, R1 |
| 7 | -- | -- | -- | -- | NEXT MIC | MOV R1, R2 |
| 8 | -- | -- | -- | -- | -- | NEXT MIC |

2 Cycles

FIG. 6

Single Cycle XCHG / 600

| Cycle | Fetch | Translate | Register | Address | Data/ALU | Write Back |
|---|---|---|---|---|---|---|
| 1 | XCHG R1,R2 | -- | -- | -- | -- | -- |
| 2 | NEXT MAC | XCHG R1,R2 | -- | -- | -- | -- |
| 3 | -- | NEXT MIC | XCHG R1,R2 | -- | -- | -- |
| 4 | -- | -- | NEXT MIC | XCHG R1,R2 | -- | -- |
| 5 | -- | -- | -- | NEXT MIC | XCHG R1,R2 | -- |
| 6 | -- | -- | -- | -- | NEXT MIC | XCHG R1,R2 |
| 7 | -- | -- | -- | -- | -- | NEXT MIC |

1 Cycle

APPARATUS AND METHOD FOR EXECUTING A SINGLE-CYCLE EXCHANGE INSTRUCTION TO EXCHANGE CONTENTS OF TWO LOCATIONS IN A REGISTER FILE

BACKGROUND OF THE INVENTION

1. Field of the Invention

This invention relates in general to the field of instruction execution in computers, and more specifically to an improved method and apparatus for executing an exchange instruction within a microprocessor.

2. Description of the Related Art

Within an instruction set for a processing system, a common instruction that is provided is an exchange instruction. The exchange instruction allows a programmer to specify within a single instruction, two operands that are to be swapped. This can be illustrated with the mnemonic XCHG R1, R2. More specifically, this instruction specifies that the contents of a register R1 are to be written into a register R2, and that the contents of the register R2 are to be written into the register R1.

Even though a single instruction allows a programmer to specify the two operand locations that are to be swapped, known microprocessors do not move both of the operands into switched locations at the same time. Rather, the first operand R1 is stored into a temporary location to preserve the contents of R1 while the contents of R2 are being written into R1. Following the retrieval of R2, and subsequent writing of the contents of R2 into R1, the microprocessor retrieves the preserved contents of R1, located in the temporary location, and writes them into R2.

The time required to first store the operand specified by R1 into a temporary location, and later retrieve this operand for storage into R2 is time consuming for the microprocessor. For example, an exchange instruction within an Intel® x86 microprocessor typically requires at least 3 clock cycles to perform a register to register operand swap. The first clock is required to store the first operand into a temporary location. The second clock retrieves the second operand and stores it into the first location. The third clock retrieves the first operand from the temporary location and stores it into the second location.

If multiple exchange instructions are used within a particular program, the time delay required for executing the exchange instructions, as described above, can significantly affect the time required to execute the program.

Therefore, what is needed is an apparatus and method that allows an exchange operation to be executed faster than has heretofore been provided. In addition what is needed is a microprocessor that executes an exchange instruction without requiring an operand to be stored into a temporary location.

SUMMARY

To address the above-detailed deficiencies, it is an object of the present invention to provide a microprocessor that executes an operand exchange instruction without requiring intermediate storage of either operand.

Accordingly, in the attainment of the aforementioned object, it is a feature of the present invention to provide a microprocessor that includes a translator coupled to interlock control. The translator is configured to receive an operand exchange instruction from a source thereof, and to generate an associated micro instruction that exchanges two operands without prescribing intermediate storage of either of the operands. The interlock control is configured to allow the associated micro instruction.

An advantage of the present invention is that execution of an exchange instruction is performed in 2 or less clock cycles.

Another object of the present invention is to execute an exchange instruction within a pipeline microprocessor in just 1 clock cycle.

In another aspect, it is a feature of the present invention to provide a microprocessor, having a register file, for executing an operand exchange instruction that exchanges operands between two locations within the register file. The microprocessor includes an exchange micro instruction and operand write back control. The exchange micro instruction exchanges a first operand and a second operand, without prescribing intermediate storage for either of the first or second operands, where the two locations are specified by the exchange micro instruction. The operand write back control is coupled to the register file. The operand write back control executes the exchange micro instruction following retrieval of the first and second operands from the two locations, and exchanges the two locations specified by the exchange micro instruction such that the first and second operands are written back into the register file in switched locations.

An advantage of the present invention is that by utilizing a two port register file, switching of the write port control during write back allows for parallel writing of two operands.

In another aspect, it is a feature of the present invention to provide a method that switches a first operand and a second operand within a microprocessor. The method includes specifying two operand locations for the first and second operands within a single exchange micro instruction, retrieving the first and second operands stored in the two operand locations in parallel, and writing the first and second operands into switched locations in parallel.

BRIEF DESCRIPTION OF THE DRAWINGS

These and other objects, features, and advantages of the present invention will become better understood with regard to the following description, and accompanying drawings where:

FIG. 4 is a table illustrating execution of an operand exchange macro instruction by the microprocessor of FIG. 3.

FIG. 6 is a table illustrating execution of an operand exchange macro instruction by the microprocessor of FIG. 5.

DETAILED DESCRIPTION

Figures 1, 2:
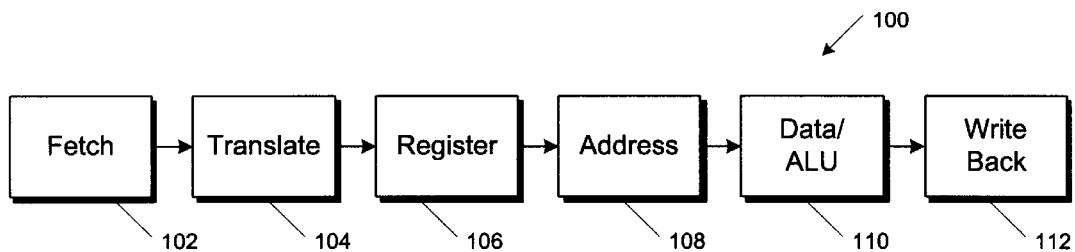
FIG. 1 is a block diagram of a related art pipeline microprocessor.
FIG. 2 is a table illustrating execution of an operand exchange macro instruction through the pipeline microprocessor of FIG. 1.

Beginning with FIG. 1, a six-stage related art pipeline microprocessor 100 is shown. The microprocessor 100 includes: Fetch 102, Translate 104, Register 106, Address 108, Data/ALU 110 and Write Back 112 stages. The Fetch stage 102 fetches instructions that are to be executed by the microprocessor 100. The Translate stage 104 translates or decodes the fetched instructions into a sequence of micro operations that may be executed by the microprocessor 100. The Register stage 106 retrieves operands specified by the micro operations from a register file, for use by later stages in the pipeline. The Address stage 108 calculates memory addresses specified by micro instructions, to be used in data storage and retrieval operations. The Data/ALU stage 110 either performs ALU operations on data retrieved from the register file, or reads/writes data from/to memory using the memory addresses calculated in the Address stage 108. The Write Back stage 112 writes the result of a data read operation, or an ALU operation, to the register file, or to a memory location.

In operation, macro instructions are fetched by the Fetch stage 102, are translated into micro instructions by the Translate stage 104, and proceed through stages 106–112 for execution.

Now referring to FIG. 2, a table 200 is provided that illustrates progression of an operand exchange macro instruction through the stages of the pipeline microprocessor of FIG. 1. A macro instruction is designated as XCHG R1,R2. R1 and R2 designate operands of the macro instruction that are to be exchanged. Progression of the macro instruction through each stage of the pipeline is shown with respect to cycles of a microprocessor clock.

During cycle 1, the operand exchange macro instruction, XCHG R1,R2, enters the Fetch stage 102 of the pipeline and is placed into an instruction buffer (not shown).

During cycle 2, the operand exchange macro instruction proceeds into the Translate stage 104. In this stage it is translated into an associated micro instruction sequence. The first micro instruction in the sequence, MOV TMP,R1 specifies that operand R1 is to be placed into an intermediate storage location designated by TMP (not shown). Also, during cycle 2, the next macro instruction, designated NEXT MAC, enters the Fetch stage 102 of the pipeline.

During cycle 3, the first micro instruction enters the Register stage 106 of the pipeline. In this stage, the contents of register R1 (not shown) are retrieved and provided to the Address stage 108. In addition, a second micro instruction in the associated micro instruction sequence is presented by the Translate stage 104. The second micro instruction, MOV R1,R2, specifies that operand R2 is to be placed into register R1.

During cycle 4, the first micro instruction enters the Address stage 108 of the pipeline. In this stage, the contents of R1 are forwarded to the Data/ALU stage 110. In addition, the second micro instruction enters the Register stage 106 of the pipeline and the contents of register R2 (not shown) are retrieved and provided to the Address stage 108. Also, a third micro instruction in the associated micro instruction sequence is presented by the Translate stage 104. The third micro instruction, MOV R2,TMP, specifies that the contents of the intermediate storage location TMP are to be placed in the register R2.

During cycle 5, the first micro instruction enters the Data/ALU stage 110 of the pipeline. In this stage, the contents of R1 are forwarded to the Write Back stage 112. Also, the second micro instruction enters the Address stage 108 and the contents of R2 are forwarded to the Data/ALU stage 110. In addition, the third micro instruction enters the Register stage 106 and is forwarded to the Address stage 108.

During cycle 6, the first micro instruction, MOV TMP,R1, enters into the Write Back stage 112. In this stage, the contents of R1 are written into the intermediate storage location TMP. In addition, the second micro instruction, MOV R1,R2 enters the Data/ALU stage 110 and the contents of R2 are forwarded to the Write Back stage 112. Furthermore, the third micro instruction, MOV R2,TMP, enters the Address stage 108 and is forwarded to the Data/ALU stage 110.

During cycle 7, the second micro instruction MOV R1,R2 enters into the Write Back stage 112 where the contents of R2 are written into register R1. In addition, the third micro instruction MOV R2,TMP enters into the Data/ALU stage 110 and is forwarded to the Write Back stage 112.

During cycle 8, the third micro instruction, MOV R2,TMP, enters into the Write Back stage 112 where the contents of the intermediate storage location TMP are written into register R2. At this point execution of the exchange macro instruction is complete.

As FIG. 2 illustrates, progression of the operand exchange macro instruction through the pipeline processor of FIG. 1 requires three cycles within the pipeline.

One skilled in the art will appreciate that storing an operand into an intermediate storage location has been required by the related art microprocessor to accomplish the exchange of two operands. To illustrate this point, if a first micro instruction retrieved the contents of R2 for storage in R1, and a second micro instruction retrieved the contents of R1 for storage in R2, interlock control within the microprocessor would detect that the second micro instruction specified an operand that is dependent upon resolution of the first micro instruction. More specifically, it would detect that the first micro instruction has a destination register of R1, and would not allow the second micro instruction, requiring retrieval of R1, to proceed until the first micro instruction updated the contents of R1. Such interlock detection and control, and associated resolution delay, is common in related art microprocessors. The purpose of delaying the second micro instruction, until resolution of the first micro instruction, is to prevent a subsequent micro instruction from using incorrect values in an operation. However, in the case of an exchange instruction, delaying the second micro instruction from executing, pending the overwriting of register R1, causes the needed value of R1 to be overwritten prior to its retrieval by the second micro instruction. Therefore, intermediate storage of the first operand has been needed, as shown above. However, requiring that the first operand be stored into a temporary register adds additional processing time to an operand exchange instruction. It is this problem that is addressed by the present invention, as described below.

Figure 3:
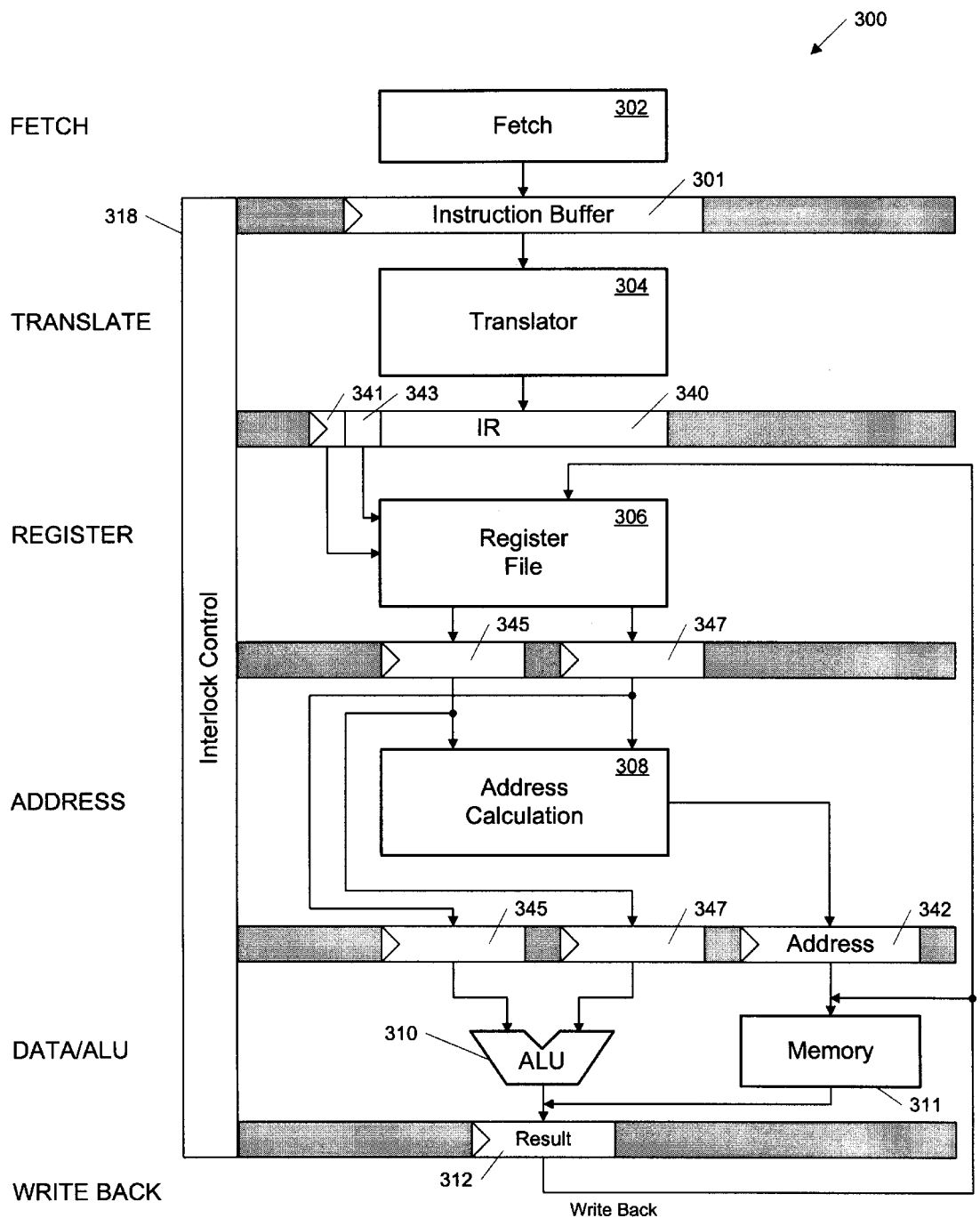
FIG. 3 is a block diagram of a pipeline microprocessor incorporating an embodiment of the present invention.

Now referring to FIG. 3, a block diagram of a pipeline microprocessor 300 incorporating an embodiment of the present invention is presented. The microprocessor 300 has six pipeline stages similar to that of FIG. 1. The Fetch unit 302 fetches macro instructions that are to be executed by the microprocessor 300 and places these macro instructions in an instruction buffer 301. The Translator 304 translates or decodes the macro instructions into a sequence of micro instructions that may be executed by the microprocessor 300. Translation of macro instructions to associated micro instruction sequences is typically accomplished by accessing the micro instruction sequences in a control ROM or by providing the micro instruction directly from the translator 304. These micro instructions are forwarded to an instruction register 340 that provides the instructions, one at a time, to the register stage. The Register stage includes a register file 306 that retrieves operands specified by the micro instructions, for use by later stages in the pipeline. These operands are specified in the micro instructions by operand indices 341 and 343. Operands retrieved from the register file 306 are placed into register buffers 345 and 347.

The Address stage contains address calculation logic 308 that, if required, calculates memory addresses specified by micro instructions, to be used in data storage and retrieval operations. These addresses are placed in an address buffer 342. In addition, register data are forwarded to the Data/ALU stage in buffers 345 and 347. The Data/ALU stage either performs ALU operations in an ALU 310 on data retrieved from the register file 306, or reads data from a memory 311 using calculated memory addresses. The result of these operations is forwarded to the Write Back stage in a result register 312. The result of a data read operation, or an ALU operation, is then written back to the register file 306, or to a memory location within the memory 311.

Interlock control 318 is provided to insure that each micro instruction operates on correct data. If a micro instruction references an operand that is dependent upon the resolution of a previous micro instruction, then interlock control does not allow the depending micro instruction to proceed further in the pipeline until the previous micro instruction is completed. Our invention, however, allows the execution of a micro instruction containing an operand that is dependent upon the resolution of a previous micro instruction when these micro instructions are performing an exchange operation.

Now referring to FIG. 4, a table 400 is provided that illustrates progression of an operand exchange macro instruction through the stages of the pipeline microprocessor of FIG. 3. The operand exchange macro instruction specifies that the contents of a first location are to be placed into a second location and the contents of the second location are to be placed into the first location. A macro instruction is designated as XCHG R1,R2. R1 and R2 designate operands of the macro instruction that are to be exchanged. Progression of the macro instruction through each stage of the pipeline is shown with respect to cycles of a microprocessor clock.

During cycle 1, the operand exchange macro instruction, XCHG R1,R2, enters the Fetch unit 302 and is placed into the instruction buffer 301. The exchange macro instruction specifies that the contents of a first location R1 be exchanged with the contents of a second location R2. Although the macro instruction in this example specifies a register-to-register exchange, the invention may also be used to perform register-to-memory or memory-to-register exchanges.

During cycle 2, the operand exchange macro instruction proceeds into the Translator 304. In this stage the macro instruction is translated into an associated micro instruction sequence. The first micro instruction in the sequence, MOV R2,R1 specifies that source operand R1 is to be placed into the location specified by destination operand R2. Also, during cycle 2, the next macro instruction, designated NEXT MAC, enters the Fetch unit 302 of the pipeline.

During cycle 3, the first micro instruction retrieves the contents of R1 from the register file 306 and provides the contents to the Address stage. In addition, a second micro instruction in the associated micro instruction sequence is presented by the Translator 304. The second micro instruction, MOV R1,R2, specifies that operand R2 is to be placed into register R1. Although the second micro instruction contains a dependent operand R2, interlock control 318 allows the second micro instruction to execute because the first micro instruction and the second micro instruction are associated with an exchange operation. Thus, any resolution delay, which normally would occur by stalling the second micro instruction, is eliminated. Interlock control 318 is accomplished by monitoring the activity of the Translator 304 and by allowing execution of an exchange micro instruction when an exchange macro instruction is detected. One mechanism of the present embodiment has the Translator 304 provide a disable signal to the interlock control 318 whenever an exchange micro instruction is translated.

During cycle 4, the first micro instruction enters the Address stage of the pipeline. In this stage, the contents of R1 are forwarded to the Data/ALU stage. In addition, the second micro instruction enters the Register stage of the pipeline and the contents of R2 in the register file 306 are retrieved and provided to the Address stage. In addition, the next macro instruction enters into the Translator 304 where it is translated accordingly. For the purposes of clarity, the next macro instruction is designated NEXT MAC, and is translated into a single next micro instruction designated as NEXT MIC. Execution of the second micro instruction in the micro instruction sequence must be completed in any stage of the pipeline in order for execution of NEXT MIC to occur in that stage.

During cycle 5, the first micro instruction enters the Data/ALU stage of the pipeline. In this stage, the contents of R1 are placed into the result buffer 312. Also, the second micro instruction enters the Address stage and the contents of R2 are forwarded to the Data/ALU stage.

During cycle 6, the first micro instruction causes the contents of R1 to be written back into R2 in the register file 306. In addition, the second micro instruction, MOV R1,R2 enters the Data/ALU stage and the contents of R2 are placed in the result buffer 312.

During cycle 7, the second micro instruction MOV R1,R2 causes the contents of R2 to be written back into register R1, thus completing the exchange operation.

As FIG. 4 illustrates, progression of the operand exchange macro instruction through the pipeline processor of FIG. 3 requires two cycles within the pipeline.

One skilled in the art will appreciate that the time associated with delaying execution of a dependent micro instruction, the resolution delay time, has been eliminated during execution of an operand exchange by employing our invention. In addition, employment of our invention does not require intermediate storage of either of the operands.

Figure 5:
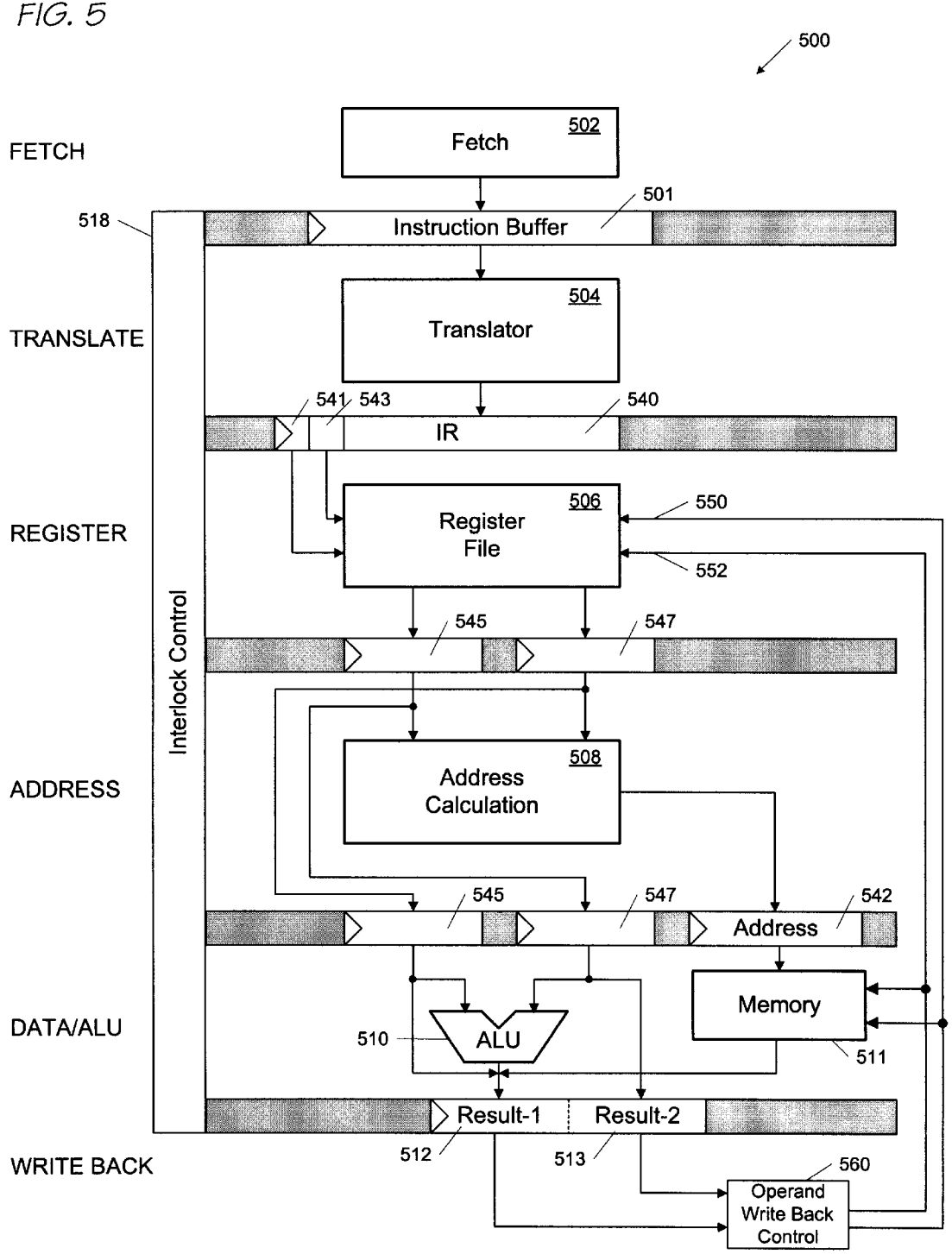
FIG. 5 is a block diagram of a pipeline microprocessor incorporating an alternative embodiment of the present invention.

Now referring to FIG. 5, a block diagram of a pipeline microprocessor 500 incorporating an alternative embodiment of the present invention is presented. The microprocessor 500 incorporates elements similar to those described above with reference to FIG. 3. Like elements have like references with the hundreds digit replaced by a 5. In addition, the microprocessor 500 includes an additional result register 513, thus allowing two operands to be forwarded to the Write Back stage. Operand Write Back Control 560 is provided to cause the contents of the result registers, 512 and 513, to be written back to the register file 506 selectively, and in parallel via write ports 550 and 552, or to a memory location within the memory 511.

Now referring to FIG. 6, a table 600 is provided that illustrates progression of an operand exchange macro instruction through the stages of the pipeline microprocessor 500. A macro instruction is designated as XCHG R1,R2. R1 and R2 designate operands of the macro instruction that are to be exchanged. Progression of the macro instruction through each stage of the pipeline is shown with respect to cycles of a microprocessor clock.

During cycle 1, the operand exchange macro instruction, XCHG R1,R2, enters the Fetch unit 502 and is placed into the instruction buffer 501. The exchange macro instruction specifies that the contents of a first location R1 be exchanged with the contents of a second location R2. Although the macro instruction in this example specifies a register-to-register exchange, the invention may also be used to perform register-to-memory or memory-to-register exchanges.

During cycle 2, the operand exchange macro instruction proceeds into the translator 504. Rather than translating the exchange macro instruction into a sequential series of load instructions as is shown in FIG. 4, the translator 504 in this embodiment of the present invention places an exchange micro instruction in the instruction register 540. The exchange micro instruction specifies that operand R1 is to be placed into the location specified by operand R2 and that operand R2 is to be placed into the location specified by operand R1. In other words, the contents of the locations R1 and R2 are to be switched. Also, during cycle 2, the next macro instruction, designated NEXT MAC, enters the Fetch unit 502 of the pipeline. Further reference to the next macro instruction will not be made.

During cycle 3, the exchange micro instruction retrieves the contents of R1 and R2 from the register file 306 and provides the contents to the Address stage in buffers 545 and 547.

During cycle 4, the exchange micro instruction enters the Address stage of the pipeline. In this stage, the contents of R1 and R2 are forwarded to the Data/ALU stage.

During cycle 5, the exchange micro instruction enters the Data/ALU stage of the pipeline. In this stage, the contents of R1 and R2 are placed into the result buffers, 512 and 513.

During cycle 6, the exchange micro instruction causes the contents of R1 and R2 to be written back into the register file 506 in switched locations, that is, the contents of R1 are written back into location R2 in the register file 506 and the contents of R2 are written back into location R1 in the register file 506. Operand write back control 560 detects that the operands are to be exchanged and controls the write back of the contents of R1 and R2 via write ports 550 and 552 such that the locations specified by the XCHG R1,R2 instruction are swapped at the write back stage, thus completing the exchange operation.

As FIG. 6 illustrates, progression of the operand exchange macro instruction through the pipeline processor of FIG. 5 requires only one cycle within the pipeline.

Figure 7:
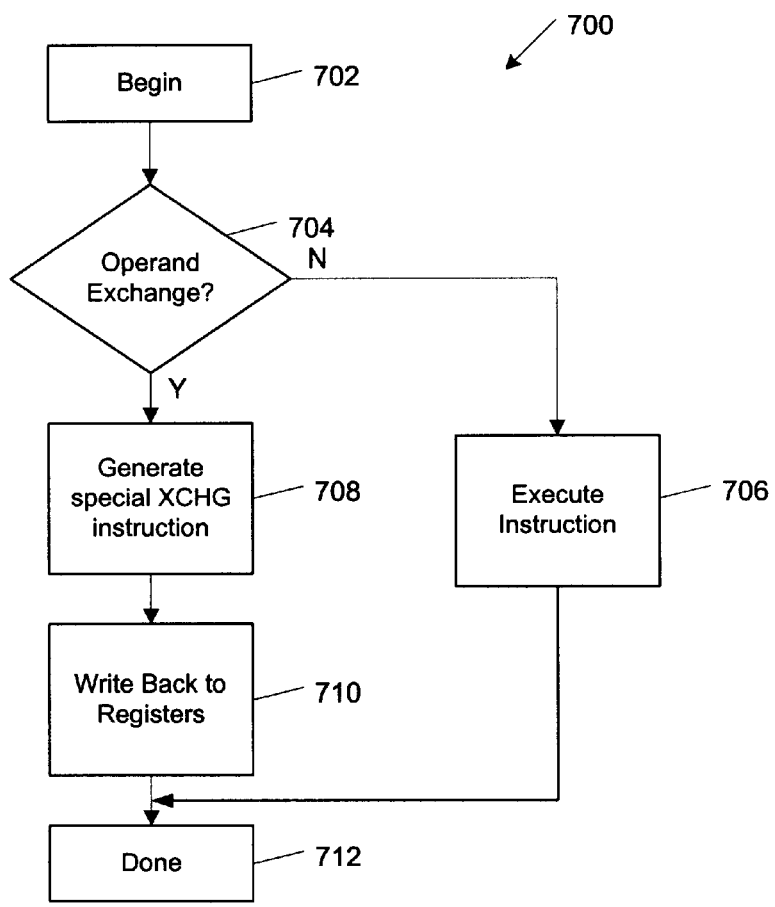
FIG. 7 is a flow chart illustrating flow of an operand exchange macro instruction according to the present invention.

Now referring to FIG. 7, flow chart 700 is presented that describes a method for swapping the contents of two operands.

The method begins at block 702 and proceeds to decision block 704. At decision block 704, a determination is made as to whether an operand exchange instruction is being executed. If not, then flow proceeds to block 706 where the instruction is executed. Otherwise, flow proceeds to block 708.

At block 708, a special form of an exchange instruction, such as that described above with reference to FIG. 6, is generated that allows operands to be exchanged between a first location and a second location within a single clock cycle of a pipeline microprocessor. Flow then proceeds to block 710.

At block 710, the exchange instruction causes to operands to be written in parallel into switched locations. More specifically, a first operand from a first location is written into a second location and a second operand from the second location is written into the first location. Upon completion of the exchange instruction, flow proceeds to block 712 where the method is complete.

Although the present invention and its objects, features, and advantages have been described in detail, other embodiments are encompassed by the invention. For example, the present invention has been described by in alternative embodiments that allow operands to be switched without storing either of them into a specified intermediate storage location. By not requiring a micro instruction to specify an intermediate location, and by disabling interlock control during execution of an exchange instruction, execution performance of an exchange operation is improved. In future microprocessors, it may be possible to write more than two operands at a time into either a register file or memory. This invention anticipates such improvements. Furthermore, the present invention has been particularly described with reference to operand exchanges where both operands are in a register file. However, it is within the scope of the present invention to allow register to memory, memory to register, and memory to memory swaps, if such can be effectively provided by a processing system.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. Microprocessor for executing an operand exchange instruction within a single pipeline clock cycle, the microprocessor comprising:

a translator, configured to receive the operand exchange instruction from a source thereof, and to generate an associated micro instruction for exchanging a first operand and a second operand without prescribing intermediate storage of either of said first or second operands, wherein said associated micro instruction is generated without regard to instructions that precede or follow the operand exchange instruction; and interlock control, coupled to said translator, configured to delay pipeline flow when it detects an operand dependency, and also configured to allow said associated micro instruction to execute without said delay;

wherein said associated micro instruction causes said operands to be exchanged within a single pipeline clock cycle.

2. The microprocessor as recited in claim 1, wherein said translator receives the operand exchange instruction from an instruction buffer.

3. The microprocessor as recited in claim 1, wherein said translator comprises a control ROM for storing said associated micro instruction.

4. The microprocessor as recited in claim 1, wherein said associated micro instruction specifies said first operand as a source operand and said second operand as a destination operand.

5. The microprocessor as recited in claim 1, wherein said interlock control prevents the execution of a micro instruction whose operands depend upon the resolution of previous micro instructions.

6. The microprocessor as recited in claim 5, wherein said delay is created when said micro instruction is prevented from executing.

7. The microprocessor as recited in claim 6, wherein said delay is associated with the time required to execute said previous micro instruction.

8. A microprocessor, having a register file, for executing an operand exchange instruction that exchanges first and second operands between first and second locations within the register file, within a single pipeline clock cycle, without regard to instructions preceding or subsequent to the operand exchange instruction, the microprocessor comprising:

an exchange micro instruction, configured to exchange the first operand and the second operand, without prescribing intermediate storage for either of the first or second operands, wherein the first and second locations are specified by said exchange micro instruction; and operand write back control, coupled to the register file, for executing said exchange micro instruction following retrieval of the first and second operands from the first and second locations, and for exchanging the first and second locations specified by said exchange micro instruction so that the first and second operands are written back into the register file in the second and first locations, respectively.

9. The microprocessor as recited in claim 8, wherein the second and first locations indicate that the first operand outputted from the first location is written into the second location, and the second operand outputted from the second location is written into the first location.

10. The microprocessor as recited in claim 8 wherein said operand write back control is coupled to an instruction register, for detecting when said exchange micro instruction is executing.

11. The microprocessor as recited in claim 8, further comprising:

a translator, coupled to said instruction register, for providing said exchange micro instruction to said instruction register.

12. The microprocessor as recited in claim 8, wherein the first and second operands are written into the register file in parallel.

13. A microprocessor for executing an operand exchange instruction that exchanges a first operand and a second operand between a first location and a second location in a register file, within a single pipeline clock cycle, without regard to instructions preceding or subsequent to the operand exchange instruction, the microprocessor comprising:

an exchange micro instruction, configured to exchange the first operand in the first location and the second operand in the second location;

the register file, configured to receive said exchange micro instruction from an instruction register, for providing the first and second operands specified by said exchange micro instruction as outputs; and operand write back control, coupled to the register file, for causing the first and second operands to be written into the register file, in parallel, in switched locations, within the single pipeline clock cycle.

14. The microprocessor as recited in claim 13, wherein the switched locations indicate that the first operand output from the first location is written into the second location, and the second operand output from the second location is written into the first location.

15. The microprocessor as recited in claim 13, wherein in parallel indicates that the first and second operands are written into the second and first locations, respectively, within the same pipeline clock cycle.

16. The microprocessor as recited in claim 13 wherein said exchange micro instruction swaps the first and second operands between the first and second locations without requiring additional micro instructions.

17. A method for switching a first operand and a second operand between a first register and a second register within a microprocessor, the method comprising:

a) specifying the first register and the second register for retrieval of the first and second operands within a single exchange micro instruction, without regard to instructions that precede or follow the single exchange micro instruction;

b) retrieving the first and second operands stored in the first and second registers, in parallel;

c) causing the specified first and second registers within the single exchange micro instruction to be switched subsequent to retrieval of the first and second operands; and d) writing the first and second operands into switched second and first locations, respectively in parallel.

18. The method as recited in claim 17, wherein said step of specifying is performed using operand indicators within the single exchange micro instruction.

19. A microprocessor, having a register file whose registers are specified by operands, the microprocessor for executing an operand exchange instruction that exchanges the contents of a first location within the register file, specified by a first operand, and a second location within the register file, specified by a second operand, the microprocessor comprising:

and exchange micro instruction, configured to exchange the contents of the first location specified by the first operand, and the second location specified by the second operand, within a single pipeline clock cycle, without prescribing intermediate storage for either of the first or second locations, and without regarding to instructions that precede or follow the operand exchange instruction; and operand write back control, coupled to the register file, for receiving said exchange micro instruction, and the contents of the first and second locations, for causing the specified first and second operands within the single exchange micro instruction to be switched subsequent to retrieval of the contents of the first and second locations specified by the first and second operands, and for writing in parallel the contents of the first and second locations back into the register file as specified by the switched first and second operands.

* * * * *